United States Patent [19]

Breton et al.

[11] Patent Number: 5,484,475
[45] Date of Patent: Jan. 16, 1996

[54] MICELLAR-BASED INK COMPOSITIONS

[75] Inventors: Marcel P. Breton, Mississauga; Geoffrey A. R. Nobes, Montreal, both of Canada

[73] Assignee: Xerox Corporation, Stamford, Conn.

[21] Appl. No.: 297,069

[22] Filed: Aug. 29, 1994

[51] Int. Cl.$^6$ .......................... C09D 11/02; C09D 11/12
[52] U.S. Cl. .................. 106/20 C; 106/22 A; 106/22 C; 106/23 A; 106/23 C
[58] Field of Search .............................. 106/20 C, 22 A, 106/22 C, 23 A, 23 C

[56] References Cited

U.S. PATENT DOCUMENTS

| | | | |
|---|---|---|---|
| 4,853,036 | 8/1989 | Koike et al. | 106/20 |
| 4,908,063 | 3/1990 | Baker et al. | 106/31 |
| 4,923,515 | 5/1990 | Koike et al. | 106/20 D |
| 5,006,170 | 4/1991 | Schwarz et al. | 106/20 |
| 5,021,802 | 6/1991 | Allred | 346/1.1 |
| 5,041,161 | 8/1991 | Cooke et al. | 106/22 |
| 5,047,084 | 9/1991 | Miller et al. | 106/27 |
| 5,065,167 | 11/1991 | You et al. | 346/1.1 |
| 5,122,187 | 6/1992 | Schwarz et al. | 106/25 |
| 5,124,718 | 6/1992 | Koike et al. | 346/1.1 |
| 5,156,675 | 10/1992 | Breton et al. | 106/20 D |
| 5,226,957 | 7/1993 | Wickramanayake et al. | 106/25 R |
| 5,240,806 | 8/1993 | Tang et al. | 430/115 |

*Primary Examiner*—Helene Klemanski
*Attorney, Agent, or Firm*—Judith L. Byorick

[57] ABSTRACT

Disclosed is an ink composition consisting essentially of water, a colorant, an organic component miscible with water, and micelles which comprise an ethoxylated alcohol. Also disclosed is a process for preparing an aqueous ink composition which comprises (a) admixing an ethoxylated alcohol with a water-miscible organic liquid at a temperature at or above the melting point of the ethoxylated alcohol to prepare a saturated solution of the ethoxylated alcohol in the organic liquid; (b) cooling the solution thus formed, thereby obtaining a solid solution with a melting point of from about 30° to about 80° C.; (c) admixing the saturated solution thus prepared with a mixture containing water and a water soluble dye at a temperature equal to or higher than the melting point of the ethoxylated alcohol solution, thereby resulting in an ink composition containing micelles which comprise the ethoxylated alcohol. Further disclosed is an ink jet printing process which comprises incorporating into an ink jet printing apparatus an ink composition which comprises water, a colorant, an organic component miscible with water, and micelles which comprise an ethoxylated alcohol, and causing droplets of the ink composition to be ejected in an imagewise pattern onto a substrate.

30 Claims, No Drawings

MICELLAR-BASED INK COMPOSITIONS

BACKGROUND OF THE INVENTION

The present invention is directed to ink compositions. More specifically, the present invention is directed to ink compositions particularly suitable for use in thermal ink jet printing processes. One embodiment of the present invention is directed to an ink composition consisting essentially of water, a colorant, an organic component miscible with water, and micelles which comprise an ethoxylated alcohol. Another embodiment of the present invention is directed to a process which comprises incorporating into an ink jet printing apparatus an ink composition which comprises water, a colorant, an organic component miscible with water, and micelles which comprise an ethoxylated alcohol, and causing droplets of the ink composition to be ejected in an imagewise pattern onto a substrate.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Ink jet printing processes may also employ inks that are solid at room temperature and liquid at elevated temperatures. For example, U.S. Pat. No 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by the heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

U.S. Pat. No. 5,006,170 (Schwarz) and U.S. Pat. No. 5,122,187 (Marchessault et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; titrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

U.S. Pat. No. 5,240,806 (Tang et al.), the disclosure of which is totally incorporated herein by reference, discloses a liquid colored electrostatic toner comprising: (A) a colored predispersion comprising (1) a non-polymeric resin material having certain insolubility (and nonswellability), melting point, and acid number characteristics; (2) an alkoxylated alcohol having certain insolubility (and nonswellability) and melting point characteristics; and (3) colorant material having certain particle size characteristics; and (B) an aliphatic hydrocarbon liquid carrier having certain conductivity, dielectric constant, and flash point.

U.S. Pat. No. 5,021,802 (Allred), the disclosure of which is totally incorporated herein by reference, discloses a bubble jet ink which comprises 90 to 99.9 percent by weight of aqueous sol-gel medium and 0.1 to 1 percent by weight colorant. The inks are thermally reversible sol-gels which are gels at ambient temperatures and sols at temperatures between about 40° and 100° C.

U.S. Pat. No. 5,041,161 (Cooke et al.), the disclosure of which is totally incorporated herein by reference, discloses an ink jet ink which is semisolid at room temperature. The ink combines the advantageous properties of thermal phase change inks and liquid inks. The inks comprise vehicles, such as glyceryl esters, polyoxyethylene esters, waxes, fatty acids, and mixtures thereof, which are semisolid at temperatures between 20° and 45° C. The ink is impulse jetted at an elevated temperature in the range of above 45° C. to about 110° C., at which temperature the ink has a viscosity of about 10 to 15 centipoise. The inks also contain 0.1 to 30 weight percent of a colorant system.

U.S. Pat. Nos. 4,853,036 and 5,124,718 disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167 (You et al.), the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084 (Miller et al.), the disclosure of which is totally incorporated herein by reference, discloses an ink jet ink in the form of a microemulsion of an organic vehicle phase having a colorant dispersed therein and an aqueous phase containing a surfactant, the vehicle phase preferably being liquid at 70° C. and solid at 20° C.

U.S. Pat. No. 5,226,957 (Wickramanayake et al.), the disclosure of which is totally incorporated herein by reference, discloses water insoluble dyes formulated in a microemulsion-based ink which is waterfast, non-threading, and bleed-alleviated. The inks comprise (a) about 0.05 to 0.75 weight percent of a high molecular weight coloid, (b) about 0.1 to 40 weight percent of at least two surfactants, comprising at least one surfactant and at least one co-surfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

U.S. Pat. No. 4,908,063 (Baker et al.), the disclosure of which is totally incorporated herein by reference, discloses an aqueous dispersion useful in formulating water-based printing inks. The dispersion contains water, an alkoxylated primary linear polymeric alcohol dispersant, and a finely divided mostly linear aliphatic hydrocarbon having a molecular weight of about 300 to 3,000 and/or a finely divided chemically modified mostly linear aliphatic hydrocarbon having a molecular weight of about 300 to 3,000.

While known compositions and processes are suitable for their intended purposes, a need remains for ink compositions suitable for thermal ink jet printing. In addition, there is a need for ink compositions which dry rapidly when used in ink jet printing processes. Further there is a need for ink compositions which enable both high print quality and rapid drying when employed in thermal ink jet printing processes. Additionally, there is a need for ink compositions which enable reduced line raggedness when employed to print lines in an ink jet printing processes.

SUMMARY OF THE INVENTION

It is an object of the present invention to provide an ink composition with the above noted advantages.

It is another object of the present invention to provide ink compositions suitable for thermal ink jet printing.

It is yet another object of the present invention to provide ink compositions which dry rapidly when used in ink jet printing processes.

It is still another object of the present invention to provide ink compositions which enable both high print quality and rapid drying when employed in thermal ink jet printing processes.

Another object of the present invention is to provide ink compositions which enable reduced line raggedness when employed to print lines in an ink jet printing processes.

These and other objects of the present invention (or specific embodiments thereof) can be achieved by providing an ink composition which consists essentially of water, a colorant, an organic component miscible with water, and micelles which comprise an ethoxylated alcohol. Another embodiment of the present invention is directed to a process which comprises incorporating into an ink jet printing apparatus an ink composition which comprises water, a colorant, an organic component miscible with water, and micelles which comprise an ethoxylated alcohol, and causing droplets of the ink composition to be ejected in an imagewise pattern onto a substrate. Yet another embodiment of the present invention is directed to a process for preparing an aqueous ink composition which comprises (a) admixing an ethoxylated alcohol with a water-miscible organic liquid at a temperature at or above the melting point of the ethoxylated alcohol to prepare a saturated solution of the ethoxylated alcohol in the organic liquid; (b) cooling the solution thus formed, thereby obtaining a solid solution with a melting point of from about 30° to about 80° C.; (c) admixing the saturated solution thus prepared with a mixture containing water and a water soluble dye at a temperature equal to or higher than the melting point of the ethoxylated alcohol solution, thereby resulting in an ink composition containing micelles which comprise the ethoxylated alcohol.

DETAILED DESCRIPTION OF THE INVENTION

The ink compositions of the present invention comprise an aqueous liquid vehicle, a colorant, an organic component, and an ethoxylated alcohol. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). In liquid ink compositions of the present invention, the water component or liquid vehicle is typically present in an amount of from about 30 to about 97 percent by weight of the ink, and preferably from about 45 to about 90 percent by weight of the ink, although the amount can be outside these ranges.

The ink composition also contains a colorant. Any suitable dye or pigment compatible with the ink liquid vehicle can be used. Examples of suitable dyes include Food dyes such as Food Black No. 2, Food Red No. 40, Food Blue No. 1, Food Yellow No. 7, and the like, FD & C dyes, anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Company (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF LP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. When the colorant is a dye, the dye is present in the ink composition in any effective amount, typically from about 0.1 to about 10 percent by weight, and preferably from about 2 to about 7 percent by weight, although the amount can be outside these ranges.

Examples of suitable pigments include various carbon blacks such as channel black, furnace black, lamp black, Raven 5250, Raven 5750, Raven 3500 and other similar carbon black products available from Columbia Company, Regal® 330, Black Pearl L, Black Pearl 1300, and other similar carbon black products available from Cabot Company, Degussa carbon blacks such as Derussol carbon black dispersions available from Degussa Company, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Particularly preferred pigment particles are nonmutagenic and nontoxic carbon black particles with a polyaromatic hydrocarbon content of less than about 1 part per million. When the colorant is a pigment, the pigment is present in any effective amount, typically from about 1 to about 10 percent by weight of the ink, although the amount can be outside these ranges.

Mixtures of dyes and pigments can also be employed.

Ink compositions of the present invention contain an ethoxylated alcohol. Ethoxylated alcohols are of the general formula $CH_3$—$(CH_2$—$CH_2)_x$—$CH_2$—O—$(CH_2$—$CH_2$—O$)_n$—H, wherein n is an integer of from about 2 to about 41, preferably from about 2 to about 10, and x is an integer of from about 5 to about 14, preferably from about 5 to about 10. Preferably, the ratio of n:x is from about 1:0.13 to about 1:3, although the ratio can be outside this range. Preferably, the number average molecular weight of the ethoxylated alcohol is from about 500 to about 1,500, although the number average molecular weight can be outside this range. Preferably, the melting point of the ethoxylated alcohol is from about 70° to about 150° C., and more preferably from about 70° to about 110° C., although the melting point can be outside these ranges. Preferably, the HLB value of the ethoxylated alcohol is from about 2 to about 18, and preferably from about 4 to about 16, although the HLB value can be outside these ranges. Examples of suitable materials include the Unithox materials, such as 420, 450, 480, 520, 550, 720, and 750, with number average molecular weights ranging from about 560 to about 1,400, all available from Petrolite Polymers Division, Tulsa, Okla. Suitable ethoxylated alcohols are also disclosed in, for example, U.S. Pat. No. 4,908,063, the disclosure of which is totally incorporated herein by reference. The ethoxylated alcohol is present in the ink in any effective amount. When the ink is a liquid at room temperature, typically the ethoxylated alcohol is present in the ink an amount of from about 2 to about 15 percent by weight, and preferably from about 3 to about 8 percent by weight, although the amount can be outside these ranges. When the ink is a hot melt ink which is solid at room temperature, typically the ethoxylated alcohol is present in the ink an amount of from about 10 to about 90 percent by weight, and preferably from about 20 to about 80 percent by weight, although the amount can be outside these ranges.

Also present in the ink is an organic component which is miscible with water. The organic component typically is a liquid into which the ethoxylated alcohol is dissolved to form a saturated solution. The liquid solubility parameter preferably is from about 18 to about 37 $MPa^{1/2}$, and more preferably from about 20 to about 30 $MPa^{1/2}$, and preferably with a solubility in water of at least about 6 percent by weight. Examples of suitable organic components include butyl carbitol (also known as diethylene glycol monobutyl ether), 1-cyclohexyl-2-pyrrolidone, propylene carbonate, ethylene carbonate, 2-amino-2-methyl-1-propanol, pyrazole, benzyl alcohol, ethylene glycol ethyl ether acetate, ethylene glycol methyl ether acetate, dipropylene glycol methyl ether acetate, propylene glycol methyl ether acetate, propylene glycol methyl ether, dipropylene glycol methyl ether, tripropylene glycol methyl ether, and other glycol ether cosolvents, such as those disclosed in U.S. Pat. No. 5,156,675, the disclosure of which is totally incorporated herein by reference, and glycol ethers available from Dow Chemical Co., Midland, Mich., under the tradename Dowanol. The organic component is present in any effective amount, typically from about 4 to about 40 percent by weight of the ink, and preferably from about 6 to about 22 percent by weight of the ink, although the amount can be outside these ranges.

Other additives can also be present in the inks. For example, polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

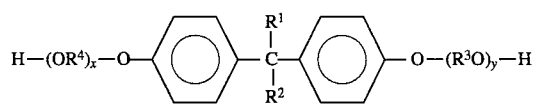

wherein $R_1$ and $R_2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science-Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylate salts, sulfite salts, amine salts, and the like, present in an amount of from 0 to about 1 percent by weight and preferably from about 0.01 to about 1 percent by weight, humectants, such as glycols, including ethylene glycol, diethylene glycol, sulfolane, pyrrolidone derivatives such as n-methyl pyrrolidone or the like, betaines, and the like, present in an amount of from 0 to about 40 percent by weight and preferably from about 5 to about 30 percent by weight, or the like.

The inks of the present invention are prepared by first admixing at elevated temperature, preferably with stirring, the ethoxylated alcohol with the organic component to form a saturated solution. Typically, the saturated solution is solid at room temperature. In one embodiment, wherein the organic component is butyl carbitol, the saturated solution typically contains from about 36 to about 55 percent by weight of the ethoxylated alcohol and from about 45 to about 64 percent by weight of the butyl carbitol, and the saturated solution is a solid at room temperature, melting at temperatures of from about 44° to about 78° C. Typically, the saturated solution contains from about 10 to about 90 percent by weight of the ethoxylated alcohol and from about 10 to about 90 percent by weight of the organic component.

The saturated solution thus formed is admixed with an aqueous solution containing the colorant and any optional ink ingredients desired. The saturated solution is heated to its melting point and admixed with the aqueous solution (which may be either at room temperature or at an elevated temperature) with stirring, which results in formation of an ink composition containing micelles of the ethoxylated alcohol. Typically, the micelles have an average particle diameter of from about 50 to about 2,000 nanometers, and more typically from about 300 to about 1,000 nanometers, as measured with a Brookhaven Instruments BI-90 particle sizer at room temperature.

While the above description is generally applicable to ink compositions which are liquid at room temperature (typically about 25° C.), ink compositions of the present invention can also be prepared which are solid at room temperature and are suitable for use in hot melt ink jet printing processes. In this embodiment, the ink is of the same general composition except that either the amount of water in the ink is decreased or an ethoxylated alcohol with a different HLB value is selected. For example, in a hot melt ink jet ink of the present invention, the colorant typically is present in an amount of from about 1 to about 10 percent, and preferably from about 2 to about 8 percent by weight, the ethoxylated alcohol is typically present in an amount of from about 10 to about 70 percent by weight, and preferably from about 30 to about 60 percent by weight, the organic component is typically present in an amount of from about 5 to about 70 percent by weight, and water typically is present in an amount of from about 10 to about 90 percent by weight, although the amounts can be outside these ranges. Inks of this type are particularly suitable for use in piezoelectric drop-on-demand printing systems and acoustic ink jet printing systems, although they can also be employed in thermal ink jet printing processes.

Inks of the present invention which are liquid at room temperature and employed in conventional thermal ink jet printing processes typically have a viscosity at 25° C. of from about 1 to about 10 centipoise, and preferably from about 4 to about 8 centipoise, although the viscosity can be outside this range. Inks of higher viscosity are also suitable for use in hot melt ink jet printing processes, wherein the ink is heated to a temperature at which its viscosity is suitable for printing, typically from about 1 to about 10 centipoise, and preferably from about 4 to about 8 centipoise, although the viscosity can be outside this range at the printing temperature.

Printed images may be generated with the inks of the present invention by incorporating the inks into a thermal ink jet printer and causing droplets of the ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. Conventional thermal ink jet printers may also be modified to make them suitable for use with hot melt inks of the present invention by including a heater for heating the ink reservoir to the temperature at or above which the ink is in the liquid phase and is at a desired viscosity. The inks of the present invention are also suitable for use in piezoelectric drop-on-demand ink jet printing systems and in continuous stream ink jet printing systems, including those that have been modified to be capable of heating the ink. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. An ethoxylated alcohol (Saturated Unithox 480, of the formula $CH_3$—

$(CH_2)_{28}$—$CH_2$—O—$(CH_2$—$CH_2$—O$)_{41}$—H, obtained from Petrolite Polymers Division, Tulsa, Okla.) (20.0 grams) was melted and added to butyl carbitol (obtained from BDH Chemicals, Ltd.) in an amount such that the resulting saturated solution contained 36.2 percent by weight of the ethoxylated alcohol. The solution thus prepared was added at a temperature of greater than 44° C. (the melting point of the saturated solution) to a stirred solution containing deionized water and Direct Blue 199 blue dye (obtained from ICI plc, England) in amounts such that the resulting ink composition contained the dye in an amount of 3.0 percent by weight and the ethoxylated alcohol in an amount of 5.3 percent by weight. The ink solution was stirred for two hours at room temperature and then filtered through a 0.45 micron filter. This ink exhibited a viscosity at 25° C. of 4.3 centipoise and contained micelles of about 300 nanometers in average particle diameter as measured with a Brookhaven BI-90 particle sizer at 20° C.

The ink thus prepared was incorporated into a Hewlett-Packard DeskJet® 500 thermal ink jet printer and images were generated on the wire side of a variety of plain office papers. The print quality of the images thus generated was measured by determining the Medium Frequency Line Edge Noise, a measure of how the edge of a printed line wanders (perpendicular to the edge) with position along the line. The results were as follows:

| Paper | MFLEN |
| --- | --- |
| Xerox Image Series Smooth (Georgia Pacific Papers, Co., Pt. Edwards, WI) | 23 |
| Hammermill Fore DP (Hammermill Paper Co., Lockhaven, PA) | 16 |
| Nekoosa Ardor Xerocopy (Georgia Pacific Papers Co., Pt. Edwards, WI) | 23 |
| Champion Datacopy (Champion Paper Co., Courtland, AL) | 25 |
| Classic Crest (Kimberly Clark Corp., Neenam, WI) | 8 |

EXAMPLE II

An ink composition was prepared as described in Example I with the exception that the relative amounts of ethoxylated alcohol/butyl carbitol saturated solution, dye, and water admixed were varied to result in an ink composition containing the dye in an amount of 3.0 percent by weight and the ethoxylated alcohol in an amount of 8.0 percent by weight. This ink exhibited viscosities of 9.4 centipoise at 25° C., 6.8 centipoise at 35° C., and 5.4 centipoise at 45° C. When incorporated into a Hewlett-Packard DeskJet® 500 thermal ink jet printer, the results were as follows:

| Paper | MFLEN |
| --- | --- |
| Xerox Image Series Smooth | 31 |
| Hammermill Fore DP | 17 |
| Nekoosa Ardor Xerocopy | 24 |
| Champion Datacopy | 23 |
| Classic Crest | 41 |

This ink was also incorporated into a modified Hewlett-Packard DeskJet® 500 thermal ink jet printer wherein the printhead contained an added heater block, and images were generated on the wire side of Xerox Image Series Smooth Paper with the ink heated to a temperature of 60° C. The Medium Frequency Line Edge Noise of these images was 28.8.

EXAMPLE III

An ink composition was prepared as describe in Example I with the exception that the saturated solution of butyl carbitol and ethoxylated alcohol was admixed with the solution containing deionized water and dye in relative amounts such that the ink contained 3.0 percent by weight of the dye and 3.26 percent by weight of the ethoxylated alcohol. The ink thus prepared exhibited a viscosity of 1.6 centipoise at 25° C. and contained micelles of about 600 nanometers in average particle diameter as measured with a Brookhaven BI-90 particle sizer at 20° C. When incorporated into a Hewlett-Packard DeskJet® 500 thermal ink jet printer, the results were as follows:

| Paper | MFLEN |
| --- | --- |
| Xerox Image Series Smooth | 34 |
| Hammermill Fore DP | 35 |
| Nekoosa Ardor Xerocopy | 40 |
| Champion Datacopy | 35 |
| Classic Crest | 40 |

EXAMPLE IV

A hot melt ink composition is prepared as follows. An ethoxylated alcohol (Unithox 420, number average molecular weight=560, HLB=4, available from Petrolite Polymers Division, Tulsa, Okla.) is melted and added at a temperature of 140° C. to butyl carbitol (available from BDH Chemicals, Ltd.) in an amount such that the resulting saturated solution contains 40.2 percent by weight of the ethoxylated alcohol. The solution thus prepared is admixed with stirring at a temperature of greater than 78° C. (the melting point of the saturated solution) with deionized water and Direct Blue 199 blue dye (available from ICI pie, England) in amounts such that the resulting ink composition contains the dye in an amount of about 3.0 percent by weight and the ethoxylated alcohol in an amount of about 5.3 percent by weight. The ink solution is stirred for two hours at the elevated temperature and then filtered through a 0.45 micron filter while in the molten state.

The ink thus prepared is incorporated into a modified Hewlett-Packard DeskJet® 500 thermal ink jet printer wherein the printhead contains an added heater block, and images are generated on plain paper.

EXAMPLE V

A hot melt ink composition is prepared as follows. An ethoxylated alcohol (Unithox 450, number average molecular weight=900, HLB-10, available from Petrolite Polymers Division, Tulsa, Okla.) is melted and added at a temperature of 140° C. to butyl carbitol (available from BDH Chemicals, Ltd.) in an amount such that the resulting saturated solution contains 55.0 percent by weight of the ethoxylated alcohol. The solution thus prepared is admixed with stirring at a temperature of greater than 75° C. (the melting point of the saturated solution) with deionized water and Direct Blue 199 blue dye (available from ICI plc, England) in amounts such that the resulting ink composition contains the dye in an amount of about 3.0 percent by weight and the ethoxylated alcohol in an amount of about 5.3 percent by weight. The ink solution is stirred for two hours at the elevated temperature and then filtered through a 0.45 micron filter while in the molten state.

The ink thus prepared is incorporated into a modified Hewlett-Packard DeskJet® 500 thermal ink jet printer wherein the printhead contains an added heater block, and images are generated on plain paper.

EXAMPLE VI

A hot melt ink composition is prepared as follows. An ethoxylated alcohol (Unithox 480, number average molecular weight=2,250, HLB=16, available from Petrolite Polymers Division, Tulsa, Okla.) is melted and added at a temperature of 140° C. to butyl carbitol (available from BDH Chemicals, Ltd.) in an amount such that the resulting saturated solution contains 36.2 percent by weight of the ethoxylated alcohol. The solution thus prepared is admixed with stirring at a temperature of greater than 44° C. (the melting point of the saturated solution) with deionized water and Direct Blue 199 blue dye (available from ICI pie, England) in amounts such that the resulting ink composition contains the dye in an amount of about 3.0 percent by weight and the ethoxylated alcohol in an amount of about 5.3 percent by weight. The ink solution is stirred for two hours at the elevated temperature and then filtered through a 0.45 micron filter while in the molten state.

The ink thus prepared is incorporated into a modified Hewlett-Packard DeskJet® 500 thermal ink jet printer wherein the printhead contains an added heater block, and images are generated on plain paper.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition consisting essentially of water, a colorant, an organic component miscible with water, and micelles which comprise an ethoxylated alcohol.

2. An ink composition according to claim 1 wherein the colorant is a water soluble dye.

3. An ink composition according to claim 2 wherein the ink contains the colorant in an amount of from about 0.1 to about 10 percent by weight.

4. An ink composition according to claim 1 wherein the ethoxylated alcohol is of the formula $CH_3-(CH_2-CH_2)_x-CH_2-O-(CH_2-CH_2-O)_n-H$, wherein n is an integer of from about 2 to about 41 and x is an integer of from about 5 to about 14.

5. An ink composition according to claim 4 wherein n is an integer of from about 2 to about 10 and x is an integer of from about 5 to about 10.

6. An ink composition according to claim 4 wherein the ratio of n:x is 1:0.13 to about 1:3.

7. An ink composition according to claim 1 wherein the ethoxylated alcohol has a number average molecular weight of from about 500 to about 1,500.

8. An ink composition according to claim 1 wherein the ethoxylated alcohol has a melting point of from about 70° to about 150° C.

9. An ink composition according to claim 1 wherein the ethoxylated alcohol has a HLB value of from about 2 to about 18.

10. An ink composition according to claim 1 wherein the ethoxylated alcohol is present in the ink in an amount of from about 2 to about 15 percent by weight.

11. An ink composition according to claim 1 wherein the organic component is selected from the group consisting of diethylene glycol monobutyl ether, 1-cyclohexyl-2-pyrrolidone, propylene carbonate, ethylene carbonate, 2-amino-2-methyl-1-propanol, pyrazole, benzyl alcohol, ethylene glycol ethyl ether acetate, ethylene glycol methyl ether acetate, dipropylene glycol methyl ether acetate, propylene glycol methyl ether acetate, propylene glycol methyl ether, dipropylene glycol methyl ether, tripropylene glycol methyl ether, and mixtures thereof.

12. An ink composition according to claim 1 wherein the organic component is present in the ink in an amount of from about 4 to about 40 percent by weight.

13. An ink composition according to claim 1 wherein the ink is a liquid at 25° C.

14. An ink composition according to claim 13 wherein the ink contains water in an amount of from about 50 to about 90 percent by weight.

15. An ink composition according to claim 13 wherein the ink has a viscosity at 25° C. of from about 4 to about 8 centipoise.

16. An ink composition which comprises water, a colorant, an organic component miscible with water, and micelles which comprise an ethoxylated alcohol, wherein the ink is a solid at 25° C.

17. An ink composition according to claim 16 wherein the ink contains water in an amount of from about 10 to about 90 percent by weight.

18. An ink composition according to claim 16 wherein the ink contains the colorant in an amount of from about 1 to about 10 percent by weight, the ethoxylated alcohol in an amount of from about 10 to about 70 percent by weight, and the organic component in an amount of from about 5 to about 70 percent by weight.

19. An ink composition according to claim 1 wherein the micelles have an average particle diameter of from about 50 to about 2,000 nanometers.

20. A process for preparing an aqueous ink composition which comprises (a) admixing an ethoxylated alcohol with a water-miscible organic liquid at a temperature at or above the melting point of the ethoxylated alcohol to prepare a saturated solution of the ethoxylated alcohol in the organic liquid; (b) cooling the solution thus formed, thereby obtaining a solid solution with a melting point of from about 30° to about 80° C.; (c) admixing the saturated solution thus prepared with a mixture containing water and a water soluble dye at a temperature equal to or higher than the melting point of the ethoxylated alcohol solution, thereby resulting in an ink composition containing micelles which comprise the ethoxylated alcohol.

21. A process according to claim 20 wherein the saturated solution contains the ethoxylated alcohol in an amount of from about 36 to about 55 percent by weight and the organic liquid in an amount of from about 45 to about 64 percent by weight.

22. In a process which comprises incorporating into an ink jet printing apparatus an ink composition and causing droplets of the ink composition to be ejected in an imagewise pattern onto a substrate, the improvement comprising selecting an ink composition which comprises water, a colorant, an organic component miscible with water, and micelles which comprise an ethoxylated alcohol.

23. In a process which comprises incorporating into an ink jet printing apparatus an ink composition and causing droplets of the ink composition to be ejected in an imagewise pattern onto a substrate, wherein the ink is selectively heated in an imagewise pattern, thereby causing droplets of the ink to be ejected in an imagewise pattern, the improvement comprising selecting an ink composition which comprises water, a colorant, an organic component miscible with water, and micelles which comprise an ethoxylated alcohol.

24. In a process for generating images which comprises incorporating into an ink jet printing apparatus an ink and forming images by melting the ink and causing the melted ink to be expelled in droplets onto a substrate, thereby generating an image on the substrate, the improvement comprising selecting an ink composition according to claim 16.

25. A process which comprises incorporating into an ink jet printing apparatus an ink composition which comprises water, a colorant, an organic component miscible with water, and micelles which comprise an ethoxylated alcohol and causing droplets of the ink composition to be ejected in an imagewise pattern onto a substrate.

26. A process according to claim 25 wherein the ink is selectively heated in an imagewise pattern, thereby causing droplets of the ink to be ejected in an imagewise pattern.

27. A process for generating images which comprises incorporating into an ink jet printing apparatus the ink composition of claim 16 and forming images by melting the ink and causing the melted ink to be expelled in droplets onto a substrate, thereby generating an image on the substrate.

28. An ink composition prepared by the process of claim 20.

29. A process which comprises incorporating into an ink jet printing apparatus an ink composition according to claim 28 and causing droplets of the ink composition to be ejected in an imagewise pattern onto a substrate.

30. A process according to claim 29 wherein the ink is selectively heated in an imagewise pattern, thereby causing droplets of the ink to be ejected in an imagewise pattern.

* * * * *